US00RE36556E

United States Patent [19]

Smith et al.

[11] E Patent Number: Re. 36,556

[45] Reissued Date of Patent: Feb. 8, 2000

[54] METHOD AND APPARATUS FOR DRILLING BORE HOLES UNDER PRESSURE

[75] Inventors: Michael L. Smith, Banquete, Tex.; Charles E. Goodman, Kaplan, La.

[73] Assignee: Cudd Pressure Control, Inc., Houston, Tex.

[21] Appl. No.: 08/443,088

[22] Filed: May 17, 1995

Related U.S. Patent Documents

Reissue of:

[64] Patent No.: 5,215,151
Issued: Jun. 1, 1993
Appl. No.: 07/766,633
Filed: Sep. 26, 1991

[51] Int. Cl.[7] ..... E21B 4/02; E21B 7/08; E21B 17/20; E21B 19/22

[52] U.S. Cl. ..... 175/45; 166/65.1; 166/237; 175/61; 175/75; 175/322

[58] Field of Search ..... 175/26, 38, 45, 175/61, 73, 74, 75, 107, 321, 322; 166/237, 384, 65.1

[56] References Cited

U.S. PATENT DOCUMENTS

| | | | |
|---|---|---|---|
| 3,246,919 | 4/1966 | Todd | 175/322 X |
| 4,361,192 | 11/1982 | Trowsdale | 340/853.5 |
| 4,379,493 | 4/1983 | Thibodeaux | 175/61 |
| 4,399,877 | 8/1983 | Jackson et al. | 175/45 |
| 4,463,814 | 8/1984 | Horstmeyer et al. | 175/45 |
| 4,697,638 | 10/1987 | Knight | 166/65.1 |
| 4,789,032 | 12/1988 | Rehm et al. | 175/45 |
| 4,828,053 | 5/1989 | Maurer et al. | 175/75 |
| 4,854,397 | 8/1989 | Warren et al. | 175/26 |
| 4,858,705 | 8/1989 | Thiery | 175/73 |
| 4,884,643 | 12/1989 | Wawrzynowski et al. | 175/74 |
| 4,940,095 | 7/1990 | Newman | 166/378 |
| 5,311,952 | 5/1994 | Eddison et al. | 175/61 |

OTHER PUBLICATIONS

Maurer et al., "Deep Earth Sampling System, Phase 1, Final Report," Maurer Engineering Inc., Jun. 1990.

*M.I.T Coil Drill–2000*, Trenchless Technology and Construction, Inc. (updated).

*Pipeline & Utilities Construction*, "Trenchless Pipelaying Report", Mar. 1990.

Drawing No. 175S100, *Assy, Steering Rotator Package*, Stri–haf–ka & Associates (Undated).

*Primary Examiner*—David J. Bagnell

*Attorney, Agent, or Firm*—William D. Jackson; William D. Harris, Jr.; Locke Liddell & Sapp LLP

[57] ABSTRACT

A method and apparatus for directional drilling to recover hydrocarbons, thermal energy, or the like, by using coiled tubing while the well is under pressure so that high density drilling fluids to control the subsurface pressures during drilling are not required. Snubbing apparatus and methods which maintain control of the bore hole pressure throughout the drilling operation are used, thus permitting the use of fresh water as a combination hydraulic fluid to operate a downhole motor and cool the bit, and to flush cuttings from the bore hole. The apparatus uses a down hole assembly including a bit driven by a motor, preferably hydraulic, which is located in a bent housing. A steering tool capable of indicating the angle and azimuth of inclination of the housing is carried by the motor housing and is connected to surface instrumentation by an electrical cable extending through the coiled tubing. The housing and steering tool are coupled to the coiled tubing string by an orientation device which can rotate the bent housing relative to the tubing string through a selected incremental amount so that the bent housing can be oriented in the appropriate direction to drill along the preselected path.

48 Claims, 5 Drawing Sheets

METHOD AND APPARATUS FOR DRILLING BORE HOLES UNDER PRESSURE

Matter enclosed in heavy brackets [ ] appears in the original patent but forms no part of this reissue specification; matter printed in italics indicates the additions made by reissue.

The present invention relates generally to method and apparatus for drilling bore holes along a predetermined path in the earth to recover hydrocarbons, thermal energy, or the like, and more particularly relates to the drilling of such wells utilizing coiled tubing and directional drilling while the well is under pressure so that high density drilling fluids to control the subsurface pressures during the drilling operation are not required.

BACKGROUND OF THE INVENTION

The conventional method for drilling bore holes in the earth to recover hydrocarbons, either oil or gas or a mixture of both, entails drilling a relatively large diameter surface bore for a few hundred feet and cementing surface casing in the bore hole to provide a seal with the surface. A stack of valves referred to as the blow out prevention (B.O.P.) stack is then connected to the top of the surface casing. Drilling operations are then carried out through the B.O.P. stack. A drill bit is attached to the lower end of heavy drill collars which are supported by joints of drill pipe, all of which are threadedly interconnected. The drilling rig includes a derrick with appropriate hoist means for assembling the drill string joint-by-joint in a vertical stack and lowering the string into the well bore until the bit engages the bottom of the bore hole. The drill string is then rotated to rotate the bit and thus cut the hole. Drilling fluids are pumped through a swivel attached to the upper end of the square Kelly joint and down through the bore hole to cool the bit and carry the cuttings up through the annulus to the surface where the cuttings are removed from the drilling fluid before the fluid is recirculated. Since subsurface hydrocarbon fluid deposits are nearly always associated with super atmospheric pressure, and the drilling fluid is at atmospheric pressure when it is returned to the surface, the drilling fluid usually includes additives to greatly increase its specific gravity so that the column of liquid standing in the annulus results in a bottom hole pressure greater than the formation pressure to prevent blow outs. Since these weighted drilling fluids must be at a higher pressure than the formation pressure, the drilling mud migrates into the cracks and pores of the formation and adversely affects the porosity of these formations. Thus, after the bore hole is completed, the heavy drilling fluids must be swabbed from the bore hole and various chemicals and fracturing techniques must be used to again open the porosity of the bore hole and permit the hydrocarbon fluids to flow into the well bore and thus to the surface.

In more recent times, technologies have been developed to drill a well bore along a predetermined path so as to produce a slanted or even a horizontally extending bore hole. These methods generally include utilizing a bit driven by a hydraulic motor disposed in a bent housing so that the resulting bore hole traverses a slightly curving path. As a result of the motor driving the rotary bit relative to the drill string, the drill string does not have to be rotated to rotate the bit. After a predetermined increment the bore hole is cut, the drilling operation is interrupted, the mud swivel is removed, and a so-called steering tool lowered on a wireline by gravity and/or pumped into position by fluids until nested in a muleshoe or other means for establishing a predetermined position relative to the motor housing. The steering tool measures the degree and azimuth of inclination of the housing and the path of the bore hole can be plotted using a series of these measurements. The drill string can then be rotated from the surface to rotate the bent housing to a desired position so that the curving bore hole will return to or follow the desired path for the bore hole. The steering tool must then be removed from the drill string by the wireline, and mud circulation resumed to continue drilling the next segment of the bore hole.

Another technology has been developed for servicing wells under pressure so that the wells do not have be killed by pumping salt water or other heavy fluids into the well bore before undertaking the service operation. This technology is known as snubbing and involves a device for maintaining a seal around the tubing as it is mechanically forced into the well bore against the well pressure until such time as the weight of the workover string exceeds the force resulting from the well pressure multiplied by the cross sectional area of the workover string at which time the unit supports the tubing string as it is lowered into the well bore. Coiled tubing has been developed together with coiled tubing injectors for inserting the coiled tubing under pressure into the well bore. The coiled tubing is a single length of tubing, without joints, which is longer than the maximum depth of the bore hole to be penetrated. The coiled tubing may be inserted into and withdrawn from the well bore as a continuous operation which can be done at a much faster rate than the more conventional system utilizing individual joints of pipe. This is because the individual joints must be threadedly interconnected as the joints are successively injected or lowered into the well bore. This process is further slowed because the tool joints have a greater diameter than the pipe and must be successively passed through pressure locks to maintain the well pressure.

Various workover tools have been attached to the leading end of a downhole coiled tubing string, including various hydraulic motor driven rotating devices, and hydraulic fluids have been circulated through the tubing strings utilizing a swivel connection to the trailing end of the tubing string which is associated with the axle of the storage reel. Similarly, electrical cable which extends for the entire length of the coiled tubing has been used to electrically connect tools at the leading end of the coiled tubing string to surface instrumentation through an appropriate rotating electrical ring and brush contacts associated with the fluid swivel. Such workover operations are believed to have been exclusively performed within previously drilled bores, and normally within an existing pipe string such as the casing or production tubing.

SUMMARY OF THE INVENTION

The present invention is concerned with improved method and apparatus for drilling a bore hole utilizing a combination of existing and new technologies to produce an usually advantageous results. The present invention permits a well bore to be drilled along a predetermined path, such as, for example, a vertical bore hole which transitions into a horizontally extending section following a relatively narrow strata containing a source of hydrocarbon to provide dramatically enhanced recovery and to produce an increased percentage of the total reserves. More importantly, this well can be drilled utilizing snubbing apparatus and methods which maintain control of the bore hole pressure throughout the drilling operation, thus permitting the use of fresh water as a combination hydraulic fluid operate a down hole motor and cool the bit, and to flush cuttings from the bore hole. Since the column of water standing in the bore hole normally results in a bottom hole pressure less than the pressure of producing hydrocarbons, the water does not migrate into the formation, and even to the extent that it does, is not harmful. The use of water eliminates major environmental concerns associated with the surface clean-up after the well has been completed. Both oil and gas will normally be produced with the water returning to the surface, and the returning mixture of fluids can be handled in a conventional cyclone separator to separate the water and associated cuttings, liquid hydrocarbons and gas. The separated water can be returned to an earthen pit where the cuttings will normally quickly settle without creating an environmental hazard and the water can be reused for recirculation through the coiled tubing string. The use of a continuous length of coiled tubing greatly accelerates the round trip required to service the hydraulic motor or bit, thus greatly expediting the drilling process. The equipment is also substantially simpler and less expensive than a conventional drilling rig.

The apparatus in accordance with the present invention utilizes a unique down hole assembly including a bit driven by a suitable motor, preferably hydraulic, which is located in a bent housing. A steering tool capable of indicating the angle and azimuth of inclination of the housing is carried by the motor housing at all times and is continually connected to surface instrumentation by an electrical cable extending through the coiled tubing. The housing and steering tool are coupled to the coiled tubing string by an orientation device which can rotate the bent housing relative to the tubing string through a selected incremental amount so that the bent housing can be oriented in the appropriate direction to drill along the preselected path.

In accordance with other important aspects of the invention, surface apparatus is provided to permit the subsurface unit, which must have a substantial length to be removed from the bore hole for servicing without losing control of the pressure in the well bore and, if necessary, while permitting the well to flow hydrocarbons.

Additional details of the method and apparatus of the present invention will be appreciated by those skilled in the art from a reading of the following detailed description and accompanying drawings wherein.

Figure 4A:
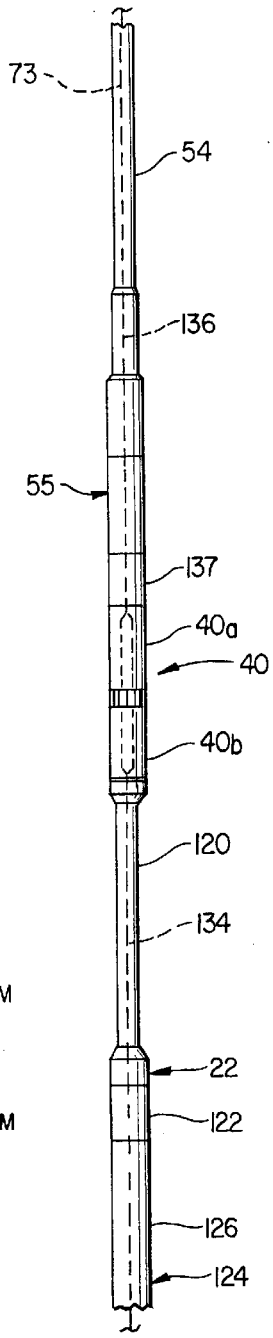
Figure 4B:
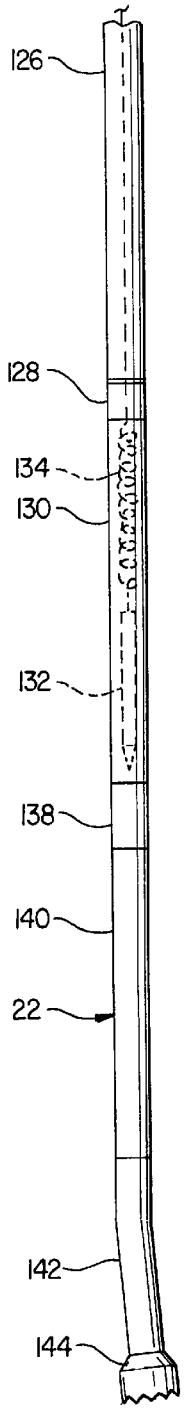
Figure 5A:
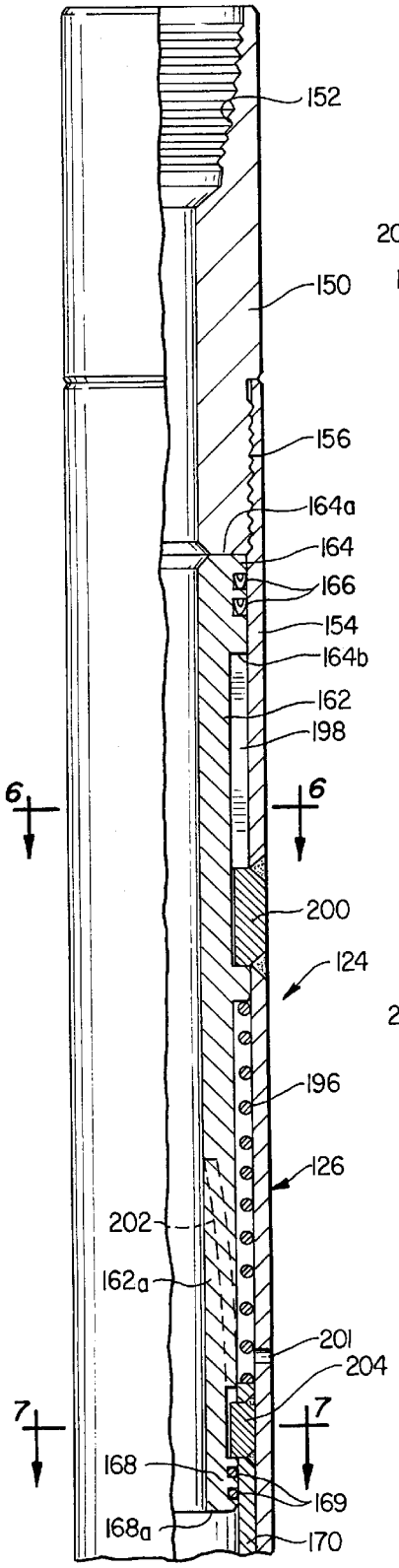
Figure 6:
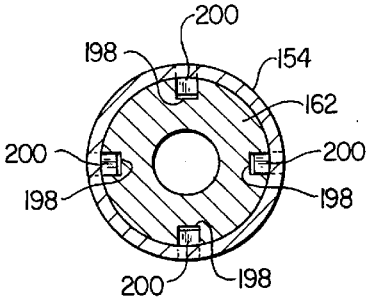
Figure 7:
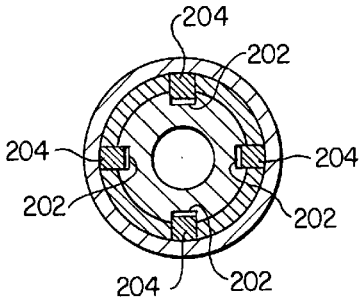
Figure 5B:
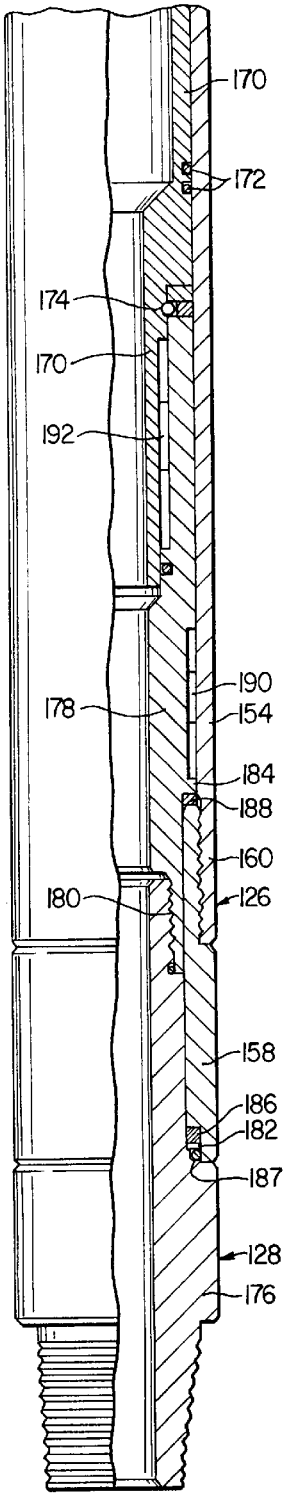
Figure 8:
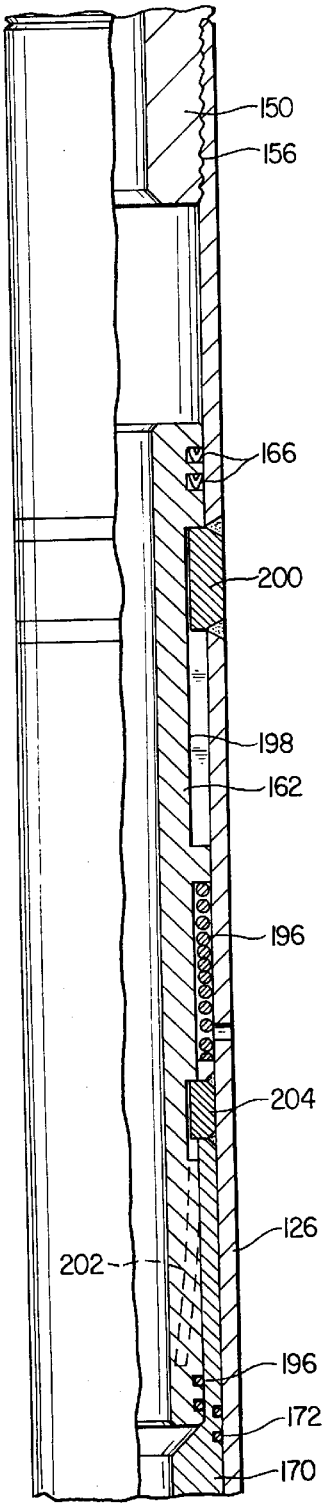
Figure 10:
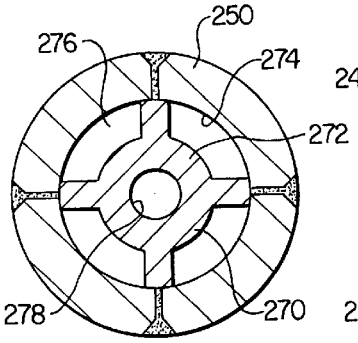
Figure 9:
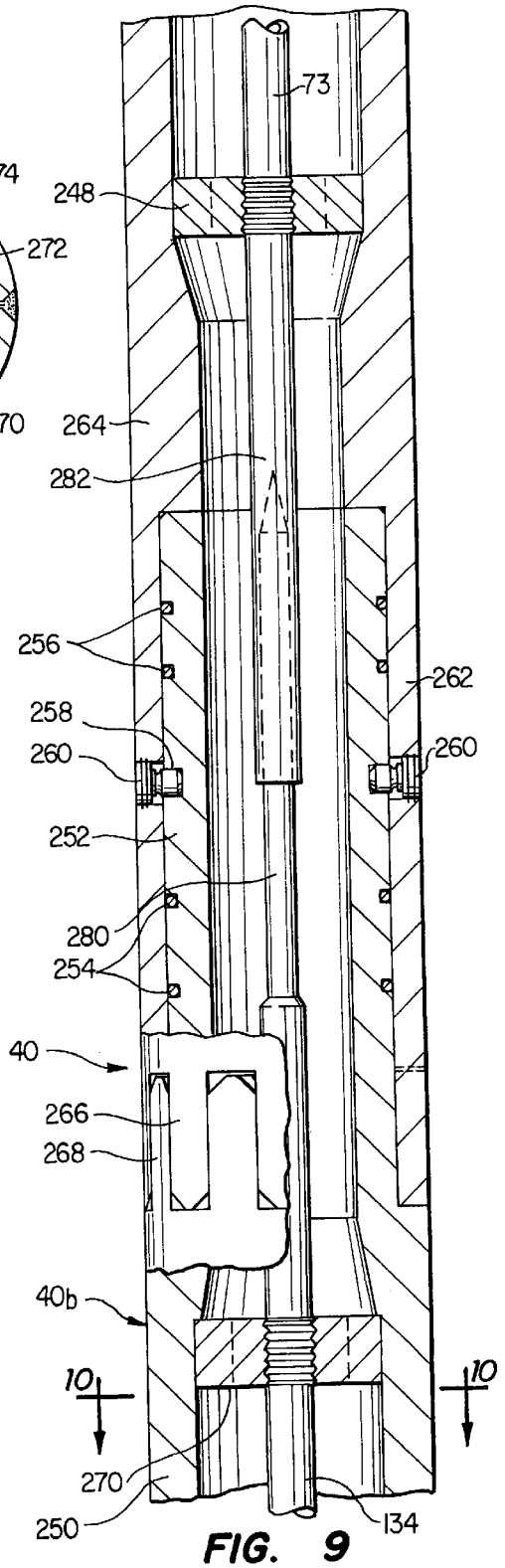
Figure 11A:
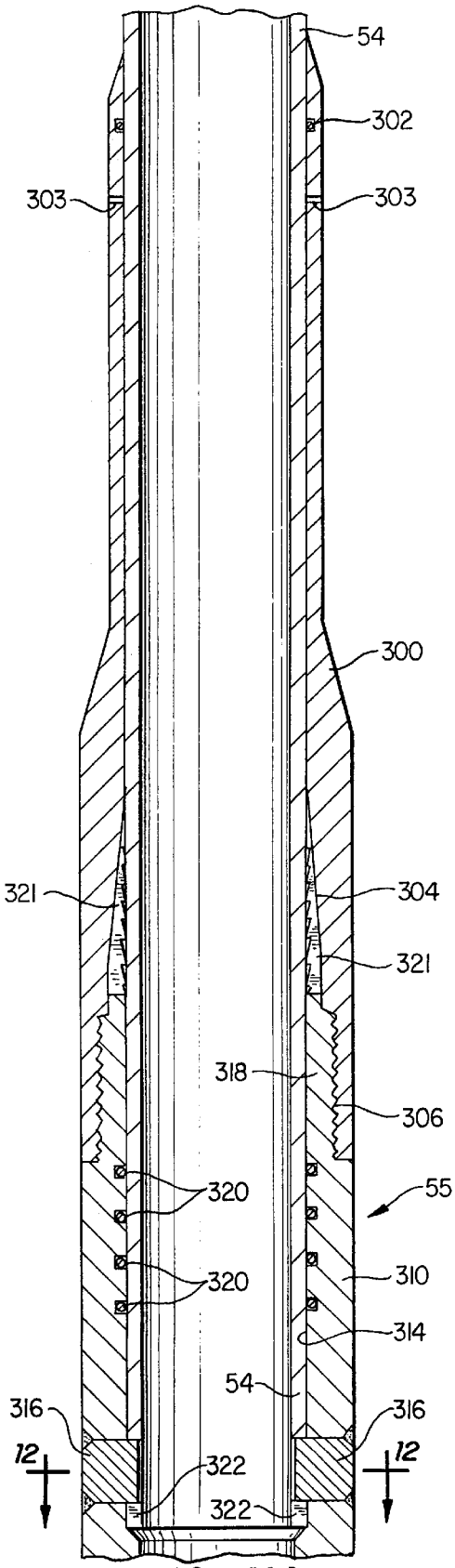
Figure 11B:
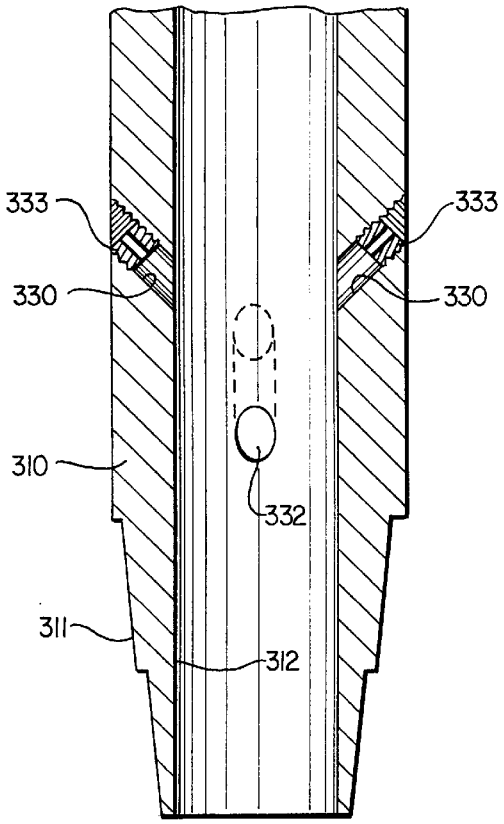
Figure 12:
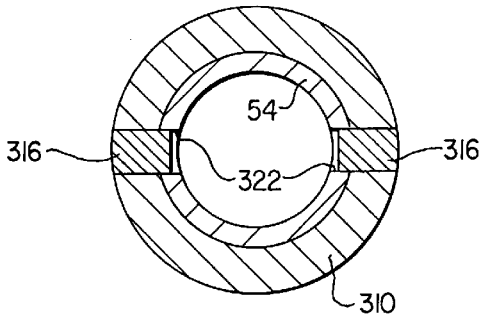

FIGS. 4A and 4B, in combination, schematically illustrate the downhole assembly of the present invention attached to the leading end of the coiled tubing string;

FIGS. 5A and 5B, in combination, illustrate an orientation device in accordance with the present invention which is included in the downhole assembly illustrated in FIGS. 4A and 4B;

FIG. 6 is a sectional view taken substantially on lines 6—6 of FIG. 5A;

FIG. 7 is a sectional view taken substantially on lines 7—7 of FIG. 5A;

FIG. 8 is a partial longitudinal sectional view similar to FIG. 8A illustrating the device in the downwardly stroked position;

FIG. 9 is a longitudinal sectional view of a coupling device for releasably coupling the coiled tubing string to the downhole apparatus illustrated in FIGS. 4A and 4B;

FIG. 10 is a sectional view taken on lines 10—10 of FIG. 9;

FIGS. 11A and 11B, in combination, disclose a tubing connector for connecting the blank end of the coiled tubing to the upper half of the coupling member illustrated in FIG. 9; and FIG. 12 is a sectional view taken substantially on lines 12—12 of FIG. 11A.

DETAILED DESCRIPTION OF THE DRAWINGS

Figures 1, 2:
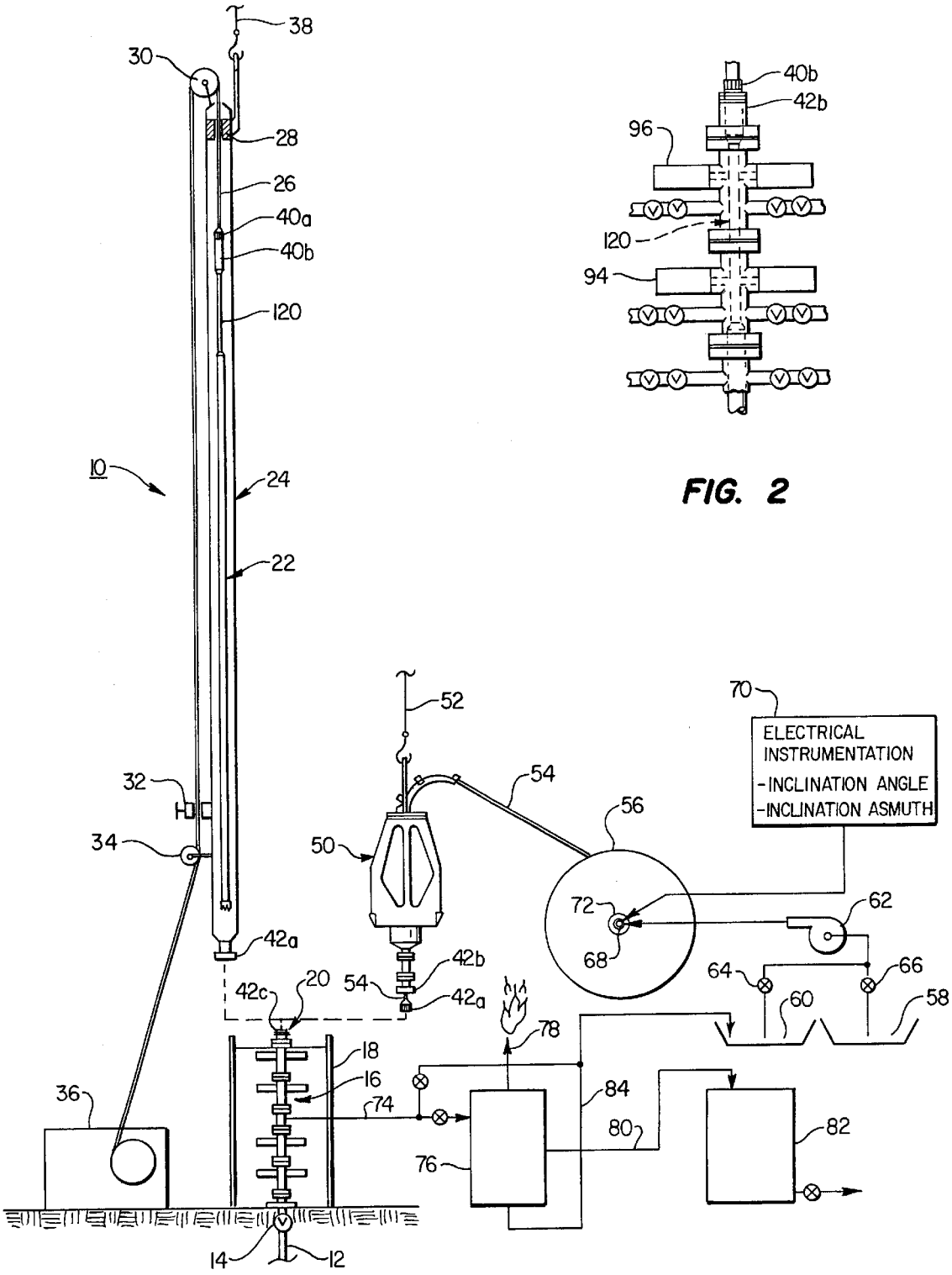
FIG. 1 is a schematic diagram illustrating the components of a drilling system in accordance with the present invention.
FIG. 2 is a more detailed, and still schematic illustration of a portion of the system illustrated in FIG. 2, and specifically illustrating the method by which the downhole assembly is supported in the surface unit to facilitate insertion and removal of the subsurface unit from the well bore.

Referring now to the drawings, a drilling system in accordance with the present invention is indicated generally by the reference numeral 10 in FIG. 1. The system 10 utilizes conventional casing 12 of a well bore to provide a pressure-tight seal with the surface of the earth. The casing may typically include one or more valves 14 which can be used in connection with pressure fracturing and other treatment to enhance performance of a completed well.

Figure 3:
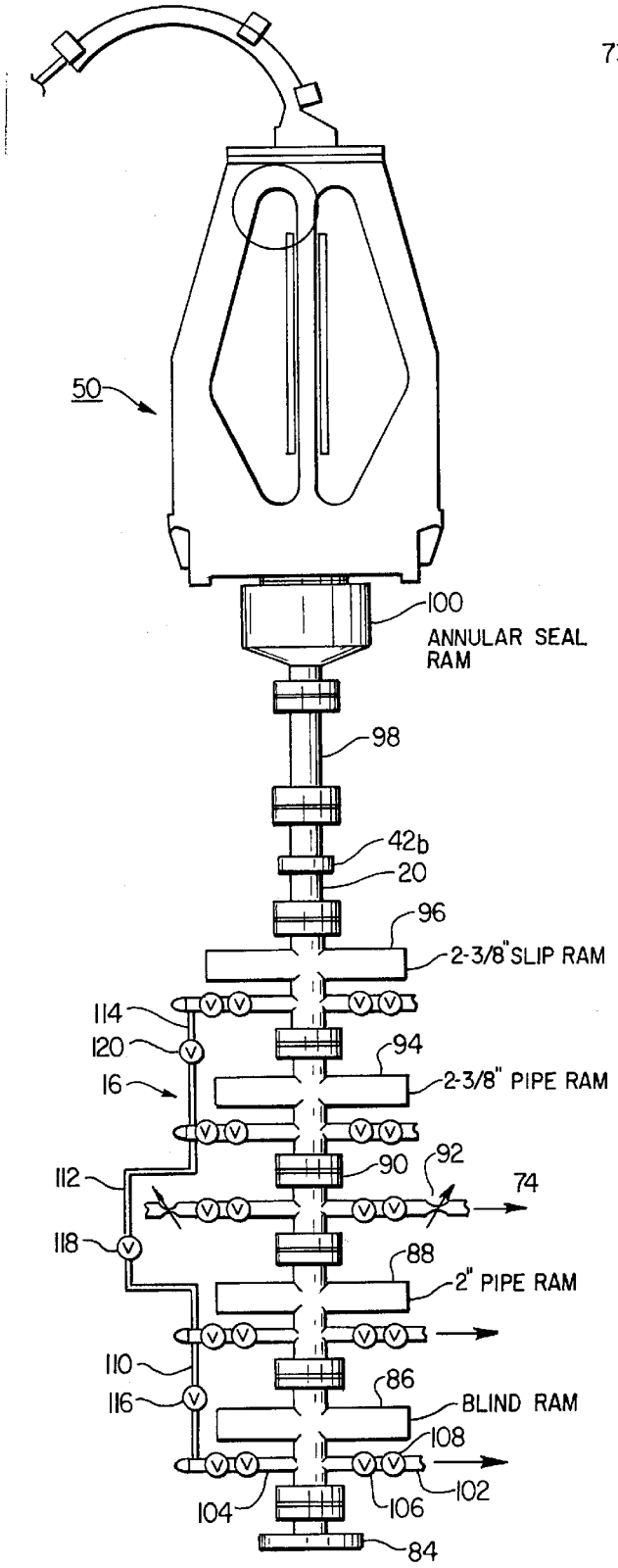
FIG. 3 is a more detailed, but still schematic representation of the surface assembly of the present invention with a coiled tubing injector mounted in place.

A surface stack in accordance with the present invention is indicated generally by the reference numeral 16 is connected to the surface casing 12 and is illustrated in greater detail in FIG. 3. A suitable scaffolding 18 is provided for workmen to attach tools to upper end of the stack 18 which includes the male portion 42*c* of a quick-connect unit 20.

A downhole tool, indicated generally by the reference numeral 22, is illustrated as being contained in a lubricator device indicated generally by the reference numeral 24. The downhole tool 22 is suspended on a wireline 26 which extends through stuffing rubbers 28 adapted to maintain well pressure within the lubricator as the wireline is raised or lowered for purposes which will presently be described. The wireline extends around a sheave 30, passes through a clamp means 32, and over second sheave 34 to a conventional wireline wench unit 36. The downhole tool 22 is approximately 60 feet in length, while the lubricator barrel 24 is approximately 80 feet in length and may be manipulated in the upright position by means of a conventional crane represented schematically by the cable and hook 38.

The wireline 26 is releasably connected to the upper end of the tool string 22 by a coupling 40, the male half 40*b* being on the tool string 22 and the female half 40*a* being carried by the wireline 26. A nut 42*a* adapted to mate with the male quick-connect union half 42*c* on the surface B.O.P. stack is provided at the lower end of the lubricator barrel 24.

A coiled tubing injector indicated generally by the reference numeral 50 may be manipulated by the same or another crane, as represented by the cable and hook 52, and includes a quick-connect nut 42*b* which is also adapted to mate with the male quick-connect coupling 42*c* on the stack 16. The coiled tubing unit may be of any suitable design such as that illustrated generally in U.S. Pat. No. 4,585,061. A length of coil tubing 54 is wound on a drum 56 in the conventional manner and may have an outside diameter of 2", for example. The coiling tubing is continuous length at least as great as the depth to which the well bore is to be drilled.

A hydraulic fluid may be pumped through the tubing from either a fresh water pit 58 or a return water pit 60 by means of a suitable pumping system represented by the pump 62 and valving 64 and 66. The water is pumped into the tubing through a swivel disposed coaxially of the axis of rotation of the drum 56 as represented generally by the reference numeral 68.

An electrical signal and/or power is provided from a surface electronic unit indicated generally by the reference numeral 70 through a rotary brush assembly also mounted coaxially with the axis of rotation of the drum 56 and represented generally by the reference numeral 72. An electronically conductive cable 73 then extends through the entire length of the coiled tubing 54 and is connected through the female portion 42*a* of the coupling 40 for connection to the downhole tool 22 as will presently be described in greater detail. The electrical instrumentation 70 may be of any conventional design but as a minimum will include the capability of determining the inclination angle and the inclination of a steering tool incorporated in the downhole tool member 22.

The fluids pumped downhole, together with any fluids being produced from the formation during the drilling operation, are returned through line 74 to a suitable fluid treatment system such as a conventional centrifugal separator 76. The gas products from the separator 76 are typically burned, as represented by the flare 78, the hydrocarbons are transmitted through line 80 to a suitable storage tank 82, and the water and particulate cuttings are transferred by line 84 to the return pit 60 where the heavier cuttings will settle and the finer particulates may be cleaned and filtered for recirculation if desired.

Referring now to FIG. 3, the surface B.O.P. stack 22 includes a flange adapter 84 for connection to the surface casing either directly or through a conventional Christmas tree if a previously completed well is being converted to a horizontal well as will hereinafter be described. A blind ram 86 is provided in the stack to completely close off the passageway through the stack when the coiled tubing is not present. Next a two inch pipe ram 88 is provided for sealing around the 2 inch o.d. coiled tubing string 54. Next, a diverter 90 is provided to divert the fluids returning from the well through a choke 92, and then to the separator 76 as previously described. A 2.375 inch pipe ram 94 is used to provide a fluid pressure seal around the hanging sub of the subsurface string as will presently be described. Similarly, a 2.375 inch slip ram 96 is provided to grip and support, but not seal, the 2.375 hanging sub of the downhole tool 22 to support the tool 22 during insertion and removal from the bore hole as will presently be described. It will be appreciated that the diameter of the rams will be selected to work with the diameter tubing selected, which may vary substantially.

The quick-connect union 20 includes male portion 42*c* which will receive the nuts 42*a* and 42*b* on the lubricator 24 and coiled tubing injector 50, respectively. A spacer sub 98 is provided between the quick-connect union sub and a Shaffer annular ram seal 100 which is always installed on the lower end of the injector 50 and provides a pressure-tight seal around the coiled tubing at all times. Each of the rams 86, 88, 94 and 96 are of commercially available design and routinely include the two access ports, such as, for example, ports 102 and 104, illustrated, in connection with blind ram 86. Each of these ports is controlled by a manual valve 106 and a remotely controllable hydraulic valve 108. Because of the duplicity of the components in FIG. 3, all of these ports and valves will be not described in detail or designated by individual reference numerals. In the operation of the system, as will presently be described, it is desirable to be able to equalize pressure on each side of the three sealing rams. This capability is illustrated schematically by interconnecting conduits 110, 112 and 114, each of which may include needle valves 116, 118, and 120.

The various components of the downhole tool 22 are illustrated schematically in greater detail in FIGS. 4A and 4B. The downhole tool 22 illustrated in FIG. 1 begins at the coupling 40 and includes the lower half 40*b* of the coupling which is connected to the hanging sub 120 which has a uniform diameter of 2.375 inches. The sub 120 could, when practical, have the same diameter as the coiled tubing string 54, but normally requires a thicker wall than the tubing 54 and thus will normally have a larger diameter. If the diameters of the hanging sub 120 and the coiled tubing 54 are the same, the 2 inch pipe ram 88 could possibly be eliminated from the stack, if desired. The hanging sub 120 is connected by a cross over 122 to an orienting tool indicated by the reference numeral 124, which includes an upper section 126 which is fixed to the tubing string 54 through various torque transmitting couplings to prevent rotation, and a lower section 128 which can be rotated relative to the upper section 126 to control the direction of the curved bore hole as will presently be described. The orientation tool 124 is illustrated in detail in FIGS. 5A and 5B which will presently be described. The lower section 128 of the orientation tool 124 is connected to a monel collar 130 which includes a suitable docking port including a muleshoe or other automatic aligning mechanism for a conventional steering tool 132. The steering tool 132 may conveniently be that typically utilized on a wireline in conventional direction drilling, and as a minimum determines the angle of inclination of the collar 130 and the azimuth of the inclination. However, unlike the normal use of a steering tool which must be lowered through the drill string for each measurement and then removed before drilling can be resumed, the steering tool 132 remains with the downhole tool string 22 at all times, and the electrical signal is supplied through the electrical cable 73 and cable 134 through a male and female connector which is incorporated in the coupling 40 as will presently be described in connection with FIG. 9 and then through the conductor 73 extending through the length of the coiled tubing 54 back to the slip ring 72 and thus to the surface instrumentation 70.

The monel collar 130 is connected through a cross-over 138 to a suitable hydraulic motor 140 of which a number are available on the market. For example, the motor 140 may be a positive displacement hydraulic motor which can be operated by the water or other hydraulic fluid. The motor 140 is connected to a bent housing section 142 through which a drive shaft (not illustrated) from the motor extends to drive a bit 144. The motor 140 is driven by being pumped through the swivel 68, tubing string 54, and all of the sections of the downhole string 22 to the motor 140 to finally exit through bit 144, then circulate back through the annulus to return through the diverter 90 and ultimately to pit 60.

The orientation tool 124 is illustrated in detail in FIGS. 5A and 5B, and is comprised essentially of four independently movable parts. The first is the upper housing 126 comprised of an upper coupling 150 having a conventional threaded box 152 to facilitate coupling into the tool string, a tubular housing 154 threadedly connected to the box member 150 by threaded coupling 156, and to a lower bushing member 158 by threaded coupling 160. A tubular differential piston 162 has an enlarged upper piston 164 which is sealed to the interior of the barrel 154 by seals 166 and a lower, smaller diameter piston member 168 which is sealed within a rotating member 170 by seals 169. The rotating member 170 rotatably oscillates in response to stroking of the piston member 162. The rotating member 170 is journaled on ball bearings 174 which is carried by the lower half of the orientation device 128 and is sealed within the barrel 154 by o-rings 172. The lower section 128 includes a lower section 176 which is connected to an upper section 178 by means of threads 180 so as to permit the members to be assembled around the thrust journal member 126. Thus, shoulders 182 and 184 engage thrust bearings 186 and 188 to permit the lower member 128 to rotate relative to the upper member 126, but to prevent axial movement due to upwardly or downwardly directed forces. An o-ring seal 187 protects the thread bearings 186 and 188 from well fluids.

Referring once again to the piston member 162, it will be noted that the total cross sectional area of the upper surface of piston portion 164, defined by the internal diameter of the member 162 and the diameter of the seal 166, is greater than the cross sectional area of the lower piston section 168 defined by the same internal diameter and the diameter of seals 169. When fluid is being pumped through the tool and then through the orifice formed by the member 162, the pressure drop through the length of the orifice results in a higher pressure being applied to the upper end of the piston than to the lower end and an even lower pressure is applied through the port 201. This combination provides a very substantial force tending to drive the piston member 162 downwardly whenever fluid is being pumped through the tubing string to the motor 140 at normal operating rates. A coiled spring 196 is provided to return the piston member 106 to the upper position illustrated in FIG. 5A when fluid is not being pumped through the piston member.

As can best be seen in FIG. 6, four longitudinally extending grooves 198 are cut in the outer diameter of the piston member 162. Four lugs 200 are welded into the housing member 154 and project into the grooves 198 to prevent rotation of the piston member relative to the upper half of the orientation tool when the piston is stroked downwardly by fluid pressure.

The lower section 162*a* of the piston member 162 is also provided with four grooves 202 which extend helically around the lower section 162*a* of the piston member. Lugs 204 are weldedly mounted in the rotating member 170 and project into the helical grooves 202. When the piston member 162 is stroked downwardly against the force of the spring 196 by fluid pressure to the position illustrated in FIG. 8, the lugs 204 on the rotating member 170 are forced to follow the helical grooves 202 and the member 170 is rotated through a predetermined angle. The pitch of the helical grooves is such as to provide predetermined finite rotary motion of the rotating member, which may conveniently be 10 degrees.

A lower roller bearing clutch 190 is positioned to prevent relative rotation between the upper member 126 and lower member 128 as a reaction to the motor driving the bit to cut hole, but permits relative rotation as a result of the rotation of the member 170 so as to reposition the bent housing as will presently be described. A second upper roller clutch assembly 192 is provided between the rotating member 170 and the clutch member 178 of the lower member 128 to cause rotation of the member 178 relative to the housing sleeve 154 in the opposite direction to that of roller clutch 190, for purposes which will presently be described.

Thus in the operation of the orientation tool, the hydraulic fluid being pumped through the piston member 162 produces a pressure acting on the large upper end 164*a* of the piston 164 that is greater than the combined pressure operating on the lower end 168*a,* and the pressure entering the port 201 from the return fluid flow in the annulus which is acting on the lower face 164*b* which causes the piston 162 to be stroked downwardly to the position illustrated in FIG. 8. Whenever fluid flow is terminated, the pressure acting on the cross sectional area represented by the face 164*a* is equal to the pressures acting on the faces 168*a* and 164*b* so that the spring 196 returns the piston member 162 to the upper position. Whenever the piston member 162 is stroked from the upper position to the lower position, the rotating member 170 is rotated in a direction to engage the clutch 192 and thus cause rotation of the members 178 and 176, thus rotating the lower portion 128 relative to the upper portion 126. Whenever the spring returns the piston member 162 to the upper position as a result of cessation of fluid flow, the clutch means 190 prevents rotation of the lower member 128 relative to the upper member 126, while the clutch member 192 permits relative opposite or return rotation of the rotating member 170 as the lugs 204 follow the helical grooves 202. In this manner, the lower member 128 and thus the bent housing 142, may be rotated through 10 degree increments each time that fluid flow is initiated by the pump 62 at the surface.

The coupling 40 is illustrated in detail in the longitudinal sectional view of FIG. 9. The coupling 40 is comprised of a lower male section 40*b* which is connected to the downhole tool 22 by a suitable threaded tool joint (not illustrated in FIG. 9) and an upper female portion 40*a,* one of which may be permanently coupled on the lower end of the coiled tubing fitting 136 by a suitable crossover 137. The lower male section 40*b* includes the housing 250 which has a reduced diameter upper male mandrel 252 which carries o-rings 254 and 256 in appropriate annular grooves. A larger central groove 258 is provided to receive shear screws 260 which are received in threaded bores in the outer sleeve 262 of the body 264 of the upper female connector half 40*a*. Torque is transmitted from the outer sleeve 262 to the lower coupling body 250 by a series of fingers 266 formed on the lower end of the tubular portion 262 which engage slots formed between fingers 268 on a lower section 250. A lower centralizer 270 is welded into the lower body 250 and has a cross sectional configuration substantially as illustrated in FIG. 10 comprised of a central portion 272 which is maintained centered within the bore of the bore 274 of the body 250 to provide fluid passageways 276. The center bore 278 is threaded to receive the male half of an electrical connector 280 for the electrical conductor 134 extending to the orienting tool 132. The upper female half 282 of the electrical connector is threadedly mounted in an identical centralizer 284 in the upper body 264.

Thus, the coupling 40 can be interconnected by merely lowering the upper female section 40*a* over the male section 40*b* so that the outer sleeve 262 telescopes over the inner mandrel 252 until the fingers 266 fully engage the slots formed by the fingers 268. In the process of the lowering, the female electrical connector 282 will automatically be properly mated with the male connector half 280. The shear screws 260 of which there may be any desired number to provide the desired total shear strength, are then screwed into the position illustrated in FIG. 9 such that the projections extend into the annular groove 258. The o-rings 254 and 256 provide the necessary fluid seal. As a result, the coupling 40 provides both torque transmission through the interlocking fingers 266 and 268, longitudinal tension as a result of the shear screws 260, and an electrical connection between the surface electronics 70 and the downhole steering tool 132 as a result of the mating of the electrical connectors 280 and 282. Further, the shear screws 260 provide a means by which the tubing string can be separated from the lower tool string by shearing the shear screws 260 in the event the lower tool string becomes sanded in or otherwise stuck in the bottom of the bore hole. Thus, the combined shear strength of the screws 260 is selected below that of the shear strength of the coiled tubing 54 so as to assure that the separation will be at the coupling 40 in the event that the lower string becomes stuck. The lower tool 22 can then be retrieved using normal fishing or milling techniques to salvage the bore hole.

A torque transmitting tubing connector suitable for use in the drilling system of the present invention is indicated generally by the reference numeral 55 in FIGS. 11A and 11B. The connector 55 is comprised of a collet 300 having an internal diameter sized to slide over the end of the coiled tubing 54. An o-ring 302 provides a fluid seal and frictional engagement which facilitates assembly. The lower end of the internal surface of collet 300 includes a outwardly tapered section 304 which eventually terminates in a threaded skirt 306. A lower connector body 310 includes a standard threaded pin 312 and also includes a stepped bore to provide a lower section which has an internal diameter 312 equal to the internal dimension of the tubing 54, and an upper section which has an internal diameter 314 adapted to receive the lower end of the tubing 54. A pair of torque lugs 316 project through the wall of member 310 and into the bore 314 a distance sufficient to intersect the wall of the tubing 54 as illustrated in FIG. 11A. The upper end 318 of the body 310 is provided with threads to mate with the threads 306 on the lower end of the collet 300. A number of o-rings 320 are provided in the bore 314 to provide a fluid seal for the joint between outside diameter of the tubing 54 and the lower body 310. A pair of semi-circular slips 322 are placed on opposites sides of the tubing 54 and urged inwardly to seat against the outside diameter of the tubing 54 by the tapered interior surface 304 of the collet 300. The lower end of the tubing 54 is provided with notches 322 which straddle the lugs 316 so that torque can be transmitted between the body 310 to the tubing 54.

The tubing connector 55 is connected to the tubing 54 by first sliding the collet 300 onto tubing 54. The o-ring 302 assists in maintaining the collet in position on the tubing 54. Next, the lower connector body 310 is positioned over the end of the tubing 54 with the slots 322 straddling the projections 316. Then the slips 322 are placed in position around the tubing 54 adjacent the upper end of the body 310, substantially as illustrated in FIG. 11A, and the collet 300 then threaded onto the boss 318. As the collet is threaded onto the boss 318, the inclined conical surface 304 firmly seats the teeth of the slips 322 into the outside surface of the tubing 54 so that a longitudinal force equal to the tensile strength of the tubing can easily be transmitted.

Two pairs of bores 330 and 332 (only one of which is shown) are provided in the lower end of the connector body 310. These bores are threaded so as to receive orifice plugs for directing drilling fluid, usually water, upwardly through the bore hole to assist in removing cuttings. These openings provide a means for increasing the circulation of drilling fluid beyond that which can be passed through the motor. For example, when cutting at significant depths at high rates, it may be desirable to pump additional water to assist in removing the cuttings. However, if well fluids are encountered and also are flowing to the surface through the chokes of the diverter, it may be desirable to minimize these extra fluids. As a result, the size orifices of the inserts in these threaded bores can be adjusted from time to time while the tool is at the surface for servicing or the bores can be completely plugged, if desired.

In utilizing the system of FIG. 1 to carry out the method of the present invention, the surface casing 12 is first installed using any suitable conventional technique. In many cases, an existing well can be advantageously used to convert a conventional vertical oriented well to a well having a horizontally extending bore which follows a producing formation or intersects a number of horizontally spaced vertical fractures. The surface B.O.P. stack 16 is installed on the surface casing and the scaffolding 18 erected to provide a work platform near the quick makeup union 20. The downhole tool is assembled in sequence with the steering tool lowered through the assembled unit into position in the monel collar 130 just before the connector 40*b* is coupled to the sub 120 to complete the assembly. The coiling tubing is passed through the injector and the tubing connector 55 assembled and mated with coupling half 40*a* below the sub 98 and quick-connect nut 42*b*.

The coupling 55 has previously been assembled on the lower end of the tubing string 54 after is has passed through the injector 50 and the shaffer ram seal 100 until the lower end is accessible to install the connector. Then the upper half of the coupling 40*b* is connected to the electrical cable extending through the coiled tubing 54 by installation of the female portion of the coupling 282 into the spider 248. The coupling half 42*a* may then be connected to the tubing connector 55. Assuming that the well is initially not under pressure, the downhole assembly 22 can be erected and lowered using the male sleeve 252 of the lower coupling half 40*b*, the annular groove 258 serving as a convenient pickup point. The tool 22 can then be lowered through the B.O.P. stack 16, with all rams open, until the hanging sub 120 is centered in the slip rams 96 and the pipe rams 94 substantially as illustrated in FIG. 2. The slip rams 96 are then closed to support the downhole tool 22 with the male coupling 40*b* projecting above the male portion of the quick-connect union 42*b*. After the injector 50 has been lowered by the crane hook 52 to the point where the coupling 40*a* can be mated with the coupling 40*b* and the shear screw 260 installed, the gripper tracts of the injector 50 are opened and the injector lowered until the nut 42*b* of the quick-connect union can be connected to the quick-connect coupling 20. The tubing injector 50 can then lower the drill motor and bit until it engages the surface of the earth to be penetrated.

At the appropriate time, water can be circulated by the pump 62 through the swivel 68 and down the coiled tubing 54 to operate the motor 140 and rotate the bit 144. The water is returned through the annulus to carry the cuttings from the bore hole to the diverter 90 and thus to the return pit 50, either directly or through the separator 76 depending upon whether any well fluids are being produced. Since the steering tool 132 is continually in position in the lower portion of the orientation tool 124, and is in continuous data communication with the surface electronics 70 through the conductor extending through the coiled tubing to the slip rings 72, the angle of inclination and the azimuth of inclination can be monitored as frequently as required to plot the actual location of the drill bit and actual orientation of the bent housing so as to determine the course needed to achieve the desired path of the bore hole.

Whenever it is desired to change the orientation of the bent housing the pump 62 need merely be stopped momentarily and the tubing slightly withdrawn to move the bit 144 slightly away from the bottom of the bore hole. When this occurs, the spring returns the piston member 162 from the downwardly stroked position illustrated in FIG. 8 to the upwardly stroked position illustrated in FIG. 5A. As a result, the rotating member 170 is rotated about 10 degrees in the reverse direction and the upper roller clutch 192 permits such rotation without rotating the lower member 178. The lower roller clutch 90 prohibits the member 178 from following the rotation of the rotating member 170. When the pump 62 is again started to cause fluid to flow through the string, the difference in pressure resulting from fluid flow forces the piston member 172 downwardly from the position shown in FIG. 5A to the position shown in FIG. 8 which results in the rotary member 170 rotating in the forward direction. At this time, the clutch rollers 192 are engaged so that the lower member 178 is also rotated while the lower roller clutch 190 is free-wheeling to permit rotation of the lower section 128. This results in the motor housing 140 and bent housing 142 being rotated approximately 10 degrees. By knowing the current azimuth of the bent housing and the desired azimuth to be attained, the pump 62 can be cycled as many times as required to orient the bent housing 142 to the desired azimuth necessary to drill the hole along the desired path. During normal drilling operations, the fluid flow can be cycled without changing the orientation of the bent housing if the pressure is maintained on the bit because the force resulting from the differential pressure acting on the reciprocating member is not adequate to rotate the housing.

When it is necessary to remove the lower assembly 22 from the bore hole for service, such as to replace the motor 140 or the bit 144, the injector 50 is operated to withdraw the coiled tubing string 54 from the well bore and the reel 56 is powered to rewind the coiled tubing. The pump 62 can be in operation during this period, if desired to be sure the bore hole is completely filled with water to minimize gas and oil incursion and to assist in washing the hole as the unit is removed. Of course, the electrical signals are still available although not normally of use during this period of time. When the hanging sub 120 is again centered relative to the slip rams 96 and pipe rams 94 as illustrated in FIG. 2, the slip rams are closed, the quick-connect union 42*b* uncoupled, the set screws 260 of the coupling 40 loosened, and the injector 50 moved from position to expose the top the downhole tool string 22 which can then be lifted using the protruding coupling half 40*b* as previously described. This procedure can be repeated until such time as the bore hole encounters pressure.

When the bore hole becomes pressurized as a result of encountering producing formations, the operation while drilling remains essentially the same except that the annular sealing device 100 contains the pressure and the returning fluids will normally be required to be passed through the choke 92 in order to control the flow volume and drop the pressure to atmospheric pressure, so that the well fluids can be passed through the separator 76 to separate the gas, oil and water. If desired, the gas and oil can actually be collected for future sale although the gas will normally be flared because of the inability to store it or connect it to a pipe line. However, when it is necessary to remove the downhole tool string 22 for service when the well is under pressure, a different procedure is required. The tool 22 is again docked in the B.O.P. stack 16 so that the hanging sub 120 is positioned in the rams 94 and 96 which are closed to contain the pressure and support the tool. The pressure between pipe rams 94 is then bled off and the union 42*b* disconnected, the injector 50 raised by the crane 52 to expose the coupling 40, and the set screws 260 loosened to permit the coiled tubing 54 to be disconnected from the tool string 22.

Then the lubricator 24 is placed in position above the union 20 and the coupling 40 on the wireline 26 lowered from the lower end of the lubricator and attached to the connector half 40*b* on the string 22. The lubricator 23 is then lowered until the quick-connect union 42*a* can be connected. The pressure are then equalized around the pipe ram 94 so that the stripping rubbers 28 in the lubricator contain the pressure around the wireline 26 within the lubricator 24. The slip rams and pipe rams may then be opened and tool string 22 pulled up into the lubricator. The blind ram 86 can then be closed to seal the bore hole and the pressure within the B.O.P. stack 16 and the lubricator 24 bled off to atmospheric so that the union nut 42*a* can be disconnected, the lubricator swung to the side of the stack 16, and the tool 22 lowered from the lubricator by the wireline to permit servicing of the bit, motor or other components of the downhole tool string 22.

After servicing of the downhole tool 22, the procedure is reversed to replace the tool in the well bore and lower it into drilling position. Thus, the tool 22 is raised into the lubricator 24 substantially to the position shown in FIG. 1, the clamp 32 tightened to hold the wireline 26 so that the tool 22 will stay in position, and the lubricator moved into position to couple the union nut 42*a* to the stack 16. The wireline then lowers the downhole tool string 22 until the hanging sub 120 is in the position illustrated in FIG. 2, the rams 94 and 96 are closed, the pressure is bled from the lubricator 24, and the union nut 42*a* again disconnected to allow the lubricator to be moved out of the way by the crane. The injector 150 is then moved in position, the coupling 40*a* connected to the protruding coupling 40*b* by tightening the set screws, the injector lowered to connect the nut 42*b* of the union, and the rams 94 and 96 opened to permit the tool to be lowered into the bore hole, and drilling operations resumed. At all times, the pressure within the bore hole is maintained by the sealing device 100. If desired, the 2 inch pipe rams 88 can be used at any time to also contain the pressure with the tubing in the hole. However, if the rams 88 are used to contain the tubing, it is necessary to circulate the returning fluids either through the valving 106 associated with either the blind ram or the 2 inch pipe ram.

The above method can be used very advantageously in horizontal drilling wherein a well bore is drilled vertically to a depth approaching a producing formation, then curved outwardly to intercept the formation with a generally horizontally extending bore hole which follows the producing formation. This provides a greatly enhanced productive capacity because of the length of the bore hole which is exposed to a producing formation, and is particularly effective in tight formations whereby porosity is such that the flow of fluids is greatly restricted.

The system employs a continuous length of coiled tubing which not only uses significantly less expensive equipment, but also greatly reduces the round trip times required to service the bit and associated down hole tools because the coiled tubing injector provides continuous insertion or retrieval rates without stopping to make-up or break the joints of a conventional drill string. The labor is significantly reduced for the same reason. Since the steering tool or inclinometer is continually carried by the down hole tool adjacent the bent housing, and is in continual communication with the surface electrical instrumentation, there is no need to terminate drilling and lower the instrument by wireline to determine the current inclination of the bore hole, again significantly reducing the operational time. Once the desired azimuth of inclination for the bent housing is determined, the bent housing can be quickly oriented to the desired position merely by cycling the fluid pump.

Perhaps the most important aspect of the invention is that it can be performed without killing the well with heavy drilling fluids by utilizing snubbing techniques in combination with the drilling operation. This is of extreme importance because fresh water can be used as the drilling fluid, thus minimizing damage to the producing formations as the well bore is drilled which normally occurs when using conventional high density drilling muds. Any hydrocarbons produced during the drilling operation can, in most cases, be salvaged for sale. Where the hydrocarbons produced are primarily gases, even these gases can be economically salvaged if desired. Further, by appropriately controlling the return flow or liquid through the chokes at the surface stack, the production of gas can be minimized because the back pressure produced by the surface choke added to the hydraulic head of water can neutralize to some extent the flow of gas into the bore hole, particularly if surplus water is supplied. In other words, by judicious use of the chokes, the effect of the light weight water column can be augmented to simulate the use of high specific gravity drilling muds.

The orientation tool 124 is a very simple system which provides positive actuation to selectively rotate the bent housing in response to starting and stopping the flow and drilling fluid. The coupling 40 provides a convenient and practical means for connecting and disconnecting the coiled tubing string to the subsurface string in both tensile and torque, and also to automatically provide a coupling for the electrical data transmission path. In addition, the coupling screws also can be secured with a predetermined shear force which provides a means for separating the lower end of the tubing string from the down hole tools in the event the down hole tools should become stuck. In such a case, the male portion of the connector with the shear groove is exposed to facilitate fishing the tool from the bore hole using standard fishing procedures. The coiled tubing connector 55 provides a means for connecting the blank end of the coiled tubing to the coupling 40 in such a manner as to also transmit both tensile forces and resist torque. In addition, the unit provides up hole fluid jets to assist in controlling the return fluid and to provide a safety washing mechanism to retrieve the tubing string.

The system can be used to convert a previously drilled well bore into a horizontal well bore extending through a producing formation. That is accomplished by utilizing existing casing for the surface B.O.P. stack, setting a kick over tool at the appropriate level in the existing casing, milling through the existing casing, and then performing the directional horizontal drilling as previously described.

Another important advantage of the present invention is that the drilling fluid can be circulated from the pump through the fluid swivel on the storage reel at all times as the tubing is tripped into and out of the bore hole. This is particularly advantageous in that it assures that the hole is not swabbed by withdrawing the downhole tool because water can continuously be added to fill the bore hole to maintain the pressure and minimize the entry of gas and liquid hydrocarbons into the bore hole.

Although preferred embodiments of the invention have been described in detail, it is to be understood that various changes, substitutions and alterations can be made therein without departing from the spirit and scope of the invention as defined by the appended claims.

What is claimed is:

1. A system for drilling a well bore along a predetermined path through the earth for the production of hydrocarbons or the like from pressurized formations which comprises:

surface casing means extending from the earth's surface into the earth to provide a fluid pressure seal with the surface of the earth;

surface stack means connected to the upper end of the surface casing and including a quick coupling half at the upper end;

downhole tool means adapted to pass through the surface stack and surface casing to drill into the earth in response to hydraulic fluid being pumped therethrough including a coupling half at the upper end;

a continuous length of coilable tubing including a coupling half for connection to the coupling half on the subsurface tool string to provide a tension and torque transmitting, disconnectable coupling;

electrical conductor means extending through the length of the coiled tubing;

storage reel means including hydraulic fluid swivel means for pumping fluid through the trailing end of the coiled tubing and electrical contact means for providing an electrical contact with the upper end of the electrical conductor means;

coiled tubing injector means adapted to be coupled by the quick coupling to the surface stack means for injecting and retrieving the tubing through the surface stack means when the well bore is under pressure, the injector means including sliding seal means for maintaining a pressure seal around the tubing as the tubing is injected into or removed from the well bore;

lubricator means including means for connection to the quick coupling on the surface stack means having sufficient length to receive the subsurface tool means when disconnected from the lower end of the coiled tubing, and including means for raising and lowering the subsurface tool means into and out of the lubricator means while containing the well pressure;

the surface stack including blind ram means for closing the well bore to contain the well pressure, pipe ram means for supporting the subsurface tool means within the surface stack with the connector half projecting from the surface stack to permit connection with the other connector half, and sealing pipe ram means for sealing the annulus around the down hole tool means when supported by the pipe ram means, and choke means for controlling the return flow of drilling fluids and hydrocarbons from the bore hole;

the downhole tool means including upper and lower sections rotatable one relative to the other, the lower section including:

a bit for boring a well bore when rotated, motor means for rotating the bit in response to power supplied through the coiled tubing string, the lower section mounting the motor means and bit and including a rigid bend which causes the bit to bore a slightly curving bore hole the direction of which is determined by the attitude of the bend in the section, electrically operated steering means for sensing the attitude of the bent section and providing an indication thereof through the electrical cable to surface equipment, and orientation means interconnecting the upper and lower sections for selectively, in response to a signal transmitted from the surface, rotating the lower section relative to the upper section to selectively position the bent housing in an attitude calculated to cause the bit to drill the bore hole along the desired path.

2. The system of claim 1 wherein the orientation means includes means for rotating the lower section a predetermined increment relative to the upper section in response to a change in the flow rate of hydraulic fluid being pumped therethrough.

3. The system of claim 1 wherein the orientation means comprises:

a tubular upper section connectable to a pipe string;

a tubular lower section connectable to the downhole tool and journaled for rotation on the lower end of the upper section;

reciprocating means disposed within at least one of the sections and axially slidable relative to the sections in response to pressure of fluid being pumped through the upper and lower section;

a rotating means disposed within at least one of the sections and rotated in one direction through a predetermined angle in response to movement of the reciprocating member through a down stroke and in the opposite direction during an upstroke; and clutch means for transmitting torque in response to rotation of the rotating member in one direction of rotation relative to one of the sections, and for not transmitting torque in response to rotation of the rotating member in the other direction of rotation.

4. The system of claim 1 wherein the coupling formed by the coupling hold on the upper end of the downhole tool means and the coupling half on the coilable tubing form a coupling comprising:

a tubular upper connector half including threaded coupling means for connecting the connector half to a coiled tubing string;

a tubular lower connector half including threaded coupling means for connecting the connector half to the downhole tube;

one of the connector halves forming a mandrel and the other connector half forming a sleeve adapted to telescopically receive the mandrel therein;

the mandrel including an annular groove extending therearound and the sleeve including a plurality of shear screws extending through the sleeve wall and into the annular grooves when the mandrel is telescopingly receiving in the sleeve to provide means for transmitting longitudinal forces from one half to the other, when the shear screws are engaged, to permit disconnecting the halves when the screws are disengaged, and the provide a predictable safety shear separation point when the longitudinal force on the coupling exceeds a predetermined value;

annular seal means between the mandrel and sleeve to prevent fluid from flowing between the mandrel and sleeve;

torque transmitting means engageable as the sleeve means is telescopically, moved into position over the mandrel for transmitting torque loads between the connector halves; and electrical connector means carried by each of the connector halves which is engageable as the sleeve means is telescopically moved into position over the mandrel for transmitting an electrical signal from any electrical conductor cable extending through the coiled tubing string and upper connector half to an electrical conductor cable; and an electrical conductor cable extending through the lower connector half to the downhole tool.

5. The system for drilling a bore hole along a preselected path through the earth comprising coiled tubing injection means including:

a length of coiled tubing wound on a storage reel having a leading end for injection into a bore hole and a trailing end coupled to a hydraulic fluid swivel means associated with the storage seal;

pump means for pumping hydraulic fluid through the swivel means and through the coiled tubing;

an electrical conductor extending through the coiled tubing and connected to contact means associated with the storage reel;

means for lowering and raising the leading end of the coiled tubing through the bore hole;

downhole tool means coupled to the leading end of the coiled tubing including bit means for drilling a bore hole when rotated, motor means for rotating the bit means in response to hydraulic fluid pumped therethrough;

tubular means including housing means for the motor means, said tubular means having a rigid bend which causes the bit to bore a slightly curving bore hole the direction of which is determined by the attitude of the housing;

electrically operated steering means coupled to the tubular means for indicating by means of the electrical conductor extending to the surface the attitude of the tubular means and housing means; and orientation means connecting the steering means and tubular means to the coiled tubing for rotating the steering means and tubular means relative to the coiled tubing to control the attitude of the housing and thus the path of the bore hole.

6. The system of claim 5 wherein the orientation means includes means for rotating the tubular means a predetermined increment relative to the coiled tubing in response to a change in the flow rate of hydraulic fluid being pumped therethrough.

7. The system of claim 5 wherein the orientation means comprises:

a tubular upper section connectable to a pipe string;

a tubular lower section connectable to the downhole tool and journaled for rotation on the lower end of the upper section;

reciprocating means disposed within at least one of the sections and axially slidable relative to the sections in response to pressure of fluid being pumped through the upper and lower section;

a rotating means disposed within at least one of the sections and rotated in one direction through a predetermined angle in response to movement of the reciprocating member through a down stroke and in the opposite direction during an upstroke; and clutch means for transmitting torque in response to rotation of the rotating member in one direction of rotation relative to one of the sections, and for not transmitting torque in response to rotation of the rotating member in the other direction of rotation.

8. The system of claim 5 wherein the coupling formed by the coupling half on the upper end of the downhole tool means and the coupling half on the coilable tubing form a coupling comprising:

a tubular upper connector half including threaded coupling means for connecting the connector half to a coiled tubing string;

a tubular lower connector half including threaded coupling means for connecting the connector half to the downhole tool;

one of the connector halves forming a mandrel and the other connector half forming a sleeve adapted to telescopically receive the mandrel therein;

the mandrel including an annular groove extending thereabound and the sleeve including a plurality of shear screws extending through the sleeve wall and into the annular grooves when the mandrel is telescopically receiving in the sleeve to provide means for transmitting longitudinal forces from one half to the other, when the shear screws are engaged, to permit disconnecting the halves when the screws are disengaged, and the provide a predictable safety shear separation point when the longitudinal force on the coupling exceeds a predetermined value;

annular seal means between the mandrel and sleeve to prevent fluid from flowing between the mandrel and sleeve;

torque transmitting means engageable as the sleeve means is telescopically moved into position over the mandrel for transmitting torque loads between the connector halves; and electrical connector means carried by each of the connector halves which is engageable as the sleeve means is telescopically moved into position over the mandrel for transmitting an electrical signal from any electrical conductor cable extending through the coiled tubing string and upper connector half to an electrical conductor cable; and an electrical conductor cable extending through the lower connector half to the downhole tool.

9. The system for drilling a bore hole along a preselected path through the earth comprising:

bit means for drilling a bore hole when rotated, motor means for rotating the bit means in response to hydraulic fluid pumped therethrough;

tubular means including housing means for the motor means, said tubular means having a rigid bend which causes the bit to bore a slightly curving bore hole the direction of which is determined by the attitude of the tubular means;

electrically operated steering means coupled to the tubular means for indicating by means of an electrical conductor extending to the surface the attitude of the tubular means; and orientation means for connecting the steering means and tubular means to a non-rotating pipe string for rotating the steering means and tubular relative to the pipe string to selectively rotate the housing and thus control the path of the bore hole.

10. The system of claim 9 wherein the orientation means includes means for rotating the tubular means a predetermined increment relative to the pipe string in response to a change in the flow rate of hydraulic fluid being pumped therethrough.

11. The system of claim 9 wherein the orientation means comprises:

a tubular upper section connectable to a pipe string;

a tubular lower section connectable to the downhole tool and journaled for rotation on the lower end of the upper section;

reciprocating means disposed within at least one of the sections and axially slidable relative to the sections in response to pressure of fluid being pumped through the upper and lower section;

a rotating means disposed within at least one of the sections and rotated in one direction through a predetermined angle in response to movement of the reciprocating member through a down stroke and in the opposite direction during an upstroke; and clutch means for transmitting torque in response to rotation of the rotating member in one direction of rotation relative to one of the sections, and for not transmitting torque in response to rotation of the rotating member in the other direction of rotation.

12. The system of claim 9 wherein the coupling formed by the coupling half on the upper end of the downhole tool means and the coupling half on the coilable tubing form a coupling comprising:

tubular upper connector half including threaded coupling means for connecting the connector half to a coiled tubing string;

a tubular lower connector half including threaded coupling means for connecting the connector half to the downhole tool;

one of the connector halves forming a mandrel and the other connector half forming a sleeve adapted to telescopically receive the mandrel therein;

the mandrel including an annular groove extending thereabound and the sleeve including a plurality of shear screws extending through the sleeve wall and into the annular grooves when the mandrel is telescopically receiving in the sleeve to provide means for transmitting longitudinal forces from one half to the other, when the shear screws are engaged, to permit disconnecting the halves when the screws are disengaged, and the provide a predictable safety shear separation point when the longitudinal force on the coupling exceeds a predetermined value;

annular seal means between the mandrel and sleeve to prevent fluid from flowing between the mandrel and sleeve;

torque transmitting means engageable as the sleeve means is telescopically moved into position over the mandrel for transmitting torque loads between the connector halves; and electrical connector means carried by each of the connector halves which is engageable as the sleeve means is telescopically moved into position over the mandrel for transmitting an electrical signal from any electrical conductor cable extending through the coiled tubing string and upper connector half to an electrical conductor cable; and an electrical conductor cable extending through the lower connector half to the downhole tool.

13. The orienting tool for rotating a bent housing or the like of a down hole tool through a predetermined angle which comprises:

a tubular upper section connectable to a pipe string;

a tubular lower section connectable to the downhole tool and journaled for rotation on the lower end of the upper section;

reciprocating means disposed within at least one of the sections and axially slidable relative to the sections in response to pressure of fluid being pumped through the upper and lower section;

a rotating means disposed within at least one of the sections and rotated in one direction through a predetermined angle in response to movement of the reciprocating member through a down stroke and in the opposite direction during an upstroke; and clutch means for transmitting torque in response to rotation of the rotating member in one direction of rotation relative to one of the sections, and for not transmitting torque in response to rotation of the rotating member in the other direction of rotation.

14. The orienting tool of claim 13 further characterized by second clutch means for transmitting torque loads between the upper and lower sections such as to prevent rotation therebetween in response to reactive torque produced by operation of the rotating bit and for permitting rotation between the upper and lower sections in response to being rotated by the first clutch means in response to movement of the reciprocating member which causes the rotating member to rotate the opposite direction.

15. The orienting tool of claim 13 wherein the reciprocating member is slidably disposed within the upper section to reciprocate through a downstroke and an upstroke and is slidably keyed thereto by first torque transmitting key means, the rotating member is rotatably journaled in the second section and is slidably keyed thereto by second torque transmitting key means;

the key means collectively causing the rotating member to oscillatably rotate through a predetermined angle in a first direction relative to the upper section during the downstroke and the same angle in the opposite direction during the upstroke, the reciprocating member including seal means to form a hydraulic piston which is stroked downwardly by differential pressures resulting from hydraulic fluid being pumped therethrough, and spring means for returning the reciprocating member through the upstroke in the absence of the differential pressure.

16. The coupling means for interconnecting a downhole tool to a coiled tubing string which comprises:

a tubular upper connector half including threaded coupling means for connecting the connector half to a coiled tubing string;

a tubular lower connector half including threaded coupling means for connecting the connector half to the downhole tool;

one of the connector halves forming a mandrel and the other connector half forming a sleeve adapted to telescopically receive the mandrel therein;

the mandrel including an annular groove extending thereabout and the sleeve including a plurality of shear screws extending through the sleeve wall and into the annular grooves when the mandrel is telescopingly receiving in the sleeve to provide means for transmitting longitudinal forces from one half to the other when the shear screws are engaged, to permit disconnecting the halves when the screws are disengaged, and thereby provide a predictable safety shear separation point when the longitudinal force on the coupling exceeds a predetermined value;

annular seal means between the mandrel and sleeve to prevent fluid from flowing between the mandrel and sleeve;

torque transmitting means engageable as the sleeve means is telescopically moved into position over the mandrel for transmitting torque loads between the connector halves; and electrical connector means carried by each of the connector halves which is engageable as the sleeve means is telescopically moved into position over the mandrel for transmitting an electrical signal from any electrical conductor cable extending through the coiled tubing string and upper connector half to an electrical conductor cable; and an electrical conductor cable extending through the lower connector half to the downhole tool.

17. The downhole tool system for drilling a bore hole along a predetermined path through the earth comprising:

bit means for drilling a bore hole when rotated;

hydraulically driven motor means for rotating the bit means in response to hydraulic fluiding pumped through the motor;

tubular means containing the motor means having a bend to cause the bit to drill slightly curving bore hole the direction of which is determined by the attitude of the bend in the tubular means;

means for sensing the attitude of the tubular means and communicating the sensed attitude to the surface; and orientation means for coupling the tubular means to a nonrotating pipe string extending to the surface for rotating the tubular means in a controlled manner relative to the pipe string in response to a signal from the surface while the pipe string is maintained stationary to orient the tubular means in a selected attitude to control the path of the bore hole.

18. The downhole tool system for drilling a bore hole along a predetermined path through the earth comprising:

bit means for drilling a bore hole when rotated;

hydraulically driven motor means for rotating the bit means in response to hydraulic fluid being pumped through the motor;

tubular means containing the motor means having a bend to cause the bit to drill a slightly curving bore hole the direction of which is determined by the attitude of the bend in the tubular means;

means for sensing the attitude of the tubular means and communicating the sensed attitude to the surface; and orientation means for coupling the tubular means to a nonrotating pipe string extending to the surface for rotating the tubular means in a controlled manner relative to the pipe string in response to a signal from the surface while the pipe string is maintained stationary to orient the tubular means in a selected attitude to control the path of the bore hole, the orientation means comprising:

a tubular upper section connectable to a pipe string;

a tubular lower section connectable to the downhole tool and journaled for rotation on the lower end of the upper section;

reciprocating means disposed within at least one of the sections and axially slidable relative to the sections in response to pressure of fluid being pumped through the upper and lower section;

a rotating means disposed within at least one of the sections and rotated in one direction through a predetermined angle in response to movement of the reciprocating member through a down stroke and in the opposite direction during an upstroke; and clutch means for transmitting torque in response to rotation of the rotating member in one direction of rotation relative to one of the sections, and for not transmitting torque in response to rotation of the rotating member in the other direction of rotation.

19. The method of drilling a bore hole along a predetermined path through the earth comprising:

progressively moving by means of a continuous length of coilable tubing a cutting bit rotated by a motor located in a bent housing adjacent the bit to bore a curved hole through the earth determined by the axially rotated position of the bent housing;

periodically determining the attitude of the bent housing and calculating the position of the bit relative to the predetermined path and the required direction to the predetermined path, and rotating the bent housing relative to the tubing while holding the tubing against axial rotation to cause the bent housing to assume an attitude to drill a bore along the predetermined path, and then continuing to progressively move the rotating cutting bit to bore a curved hole.

20. The method of claim 19 wherein the bore hole path is generally vertical at the surface and curves to intercept and follow a generally horizontal extending hydrocarbon producing earth formation.

21. The method of claim 19 wherein the motor is driven by hydraulic fluid pumped through the coiled tubing, including a coiled portion at the surface of the earth, and returning the hydraulic fluid with cuttings entrained therein to the surface.

22. The method of claim 21 wherein the hydraulic fluid is substantially fresh water.

23. The method of claim 19 wherein the attitude of the bent housing is sensed by an electrically operated device carried by the housing during drilling operations, and the signal is transmitted to the surface by an electrical conductor extending along the interior of the tubing for the full length of the tubing including a coiled portion of the tubing at the surface of the earth to indicate at the surface the attitude of the bent housing.

24. The method of claim 21 wherein the bent housing is rotated relative to the tubing by a change in flow rate of the hydraulic fluid through an orientation device disposed between the tubing and the bent housing.

25. The method of claim 19 wherein the bore hole is under super atmospheric pressure produced by hydrocarbons and the motor and associated bit must be brought to the surface for service during the drilling of the bore hole, and the bore hole pressure is maintained under control at all times at the surface of the earth as the motor and associated bit are removed from, inserted into, and operated to drill the bore hole.

26. The method of claim 25 therein hydraulic fluid is circulated through the tubing string as the tubing string is being withdrawn from the bore hole to assure that the bore hole remains under pressure.

27. The method of claim 25 wherein a downhole tool including a bit, a hydraulic motor for rotating the bit which is disposed in a bent housing, a steering tool for sensing the attitude of the housing and transmitting the information to the surface, and an orientation tool for rotating the housing to position the bent housing at the desired attitude and the lower half of a torque transmitting, fluid transmitting and electrical transmitting coupling for connection to a mating upper half of the coupling, attached to the leading end of a coiled tubing string is inserted in the bore hole by closing the bore hole with a blind valve in a surface stack connected to the surface casing to maintain the pressure, suspending the downhole tool in a lubrication barrel above the valve, equalizing the pressure across the blind valve and opening the blind valve, lowering the downhole tool through the blind valve and suspending the downhole tube with the lower half of the coupling exposed for connection and forming an annular pressure seal around the downhole tool to maintain the well pressure, connecting the upper and lower coupling halves with the coiled tubing extending below a coiled tubing injection device, lowering the coiled tubing injection device and connecting it to the surface stack to form a pressure chamber between the annular pressure seal and a second annular seal around the coiled tubing below the injection device, equalizing the pressure around the annular seal and lowering the downhole tool into the bore hole to conduct drilling operations, while maintaining the pressure seal, and reversing the sequence of steps to remove the downhole tool for servicing.

28. The method of claim 25 wherein the fluids returning from the bore hole are passed through a choke adjusted to maintain a superatmospheric pressure in the return flow annulus while reducing the pressure of the returning fluids to atmospheric.

29. The method of claim 22 wherein the returning well fluids includes hydrocarbons and the hydrocarbons are separated from the water.

*30. An orienting apparatus for use in a directional drilling tool string that includes a hydraulic motor which drives a drill bit and has a bent housing that defines a bend point, said tool string being suspended in a bore-hole on a coiled tubing string, comprising: an upper housing; a lower housing rotatable with respect to said upper housing; a piston member longitudinally relative to said upper housing and said lower housing between a lower position and an upper position; differential pressure responsive means for shifting said piston member downward to said lower position; yieldable means opposing said downward movement and causing upward movement of said piston member when said differential pressure is reduced; and means responsive to said upward and downward movements for changing the orientation of said lower housing relative to said upper housing by a selected angular amount.*

*31. The apparatus of claim 30 wherein said changing means comprises indexing means including lug means fixed on said upper housing, and axially spaced upper and lower cam means on said piston member cooperable with said lug means during said upward and downward movements for producing a change in said angular orientation.*

*32. The apparatus of claim 31 wherein said cam means includes helically inclined surfaces cooperable with said lug means for automatically turning said piston member and said lower housing relative to said upper housing in the same rotational direction in response to said upward and downward movements.*

*33. The apparatus of claim 32 wherein said upper and lower cam means include angularly spaced projections on the outer periphery of said piston member which define angularly spaced longitudinal channels therebetween so that a predetermined number of said downward and upward movements will revolve said piston member and said lower housing through and beyond* 360° of rotation relative to said upper housing.

*34. The apparatus of claim 30 wherein said differential pressure responsive means includes a flow restriction in the bore of said piston member for creating a pressure drop due to the rate of flow of drilling fluid therethrough, said pressure drop generating pressure forces which act on said piston member to shift said mandrel downward to said lower position.*

*35. The apparatus of claim 34 wherein said yieldable means includes spring means reacting between said piston member and said upper housing and biasing said piston member toward said upper position.*

*36. The apparatus of claim 30 further including means for connecting said upper housing to the lower end of said coiled tubing string, and means for connecting said lower housing member to the upper end of a steering tool.*

*37. A directional drilling tool string adapted to be suspended in a borehole on coiled tubing, comprising: a drilling motor operated by the flow of drilling fluid therethrough for rotating a drill bit at the lower end thereof, said drilling motor including a bent housing that defines a bend angle and a bend point which causes the bit to drill along a directional path; and a downhole adjustable orienting sub located in said tool string above said motor, said sub having first and second relatively rotatable housing members one of said housing members being connected to said coiled tubing and the other of said housing members being connected to said motor, and selectively operable means for changing the relative angular orientation of said housing members to control the azimuth of said directional path.*

*38. The tool string of claim 37 wherein said selectively operable means includes lug and groove means responsive to longitudinal movement for indexing said other housing member relative to said one housing member through a predetermined angle of relative rotation.*

*39. The tool string of claim 38 wherein said selectively operable means further includes a piston member mounted in said housing members and carrying one of said lug and groove means, said piston member being movable longitudinally relative to both of said housing members to cause said indexing.*

*40. The tool string of claim 39 wherein said piston member has flow restriction means in the bore thereof, said restriction means being responsive to a change in the flow rate of drilling fluids therethrough to effect longitudinal movement of said mandrel.*

*41. The tool string of claim 40 wherein said piston member moves downward in response to an increase in said flow rate, and further including resilient means for moving said mandrel upward as said flow rate is reduced.*

*42. A method of providing a selected angular orientation in a borehole of the bent housing or sub that is operatively associated with a downhole drilling motor which drives a drill bit and which is suspended in the borehole on a string of coiled tubing, comprising the steps of: providing an orientation sub having an upper housing that is connected to the coiled tubing and a lower housing that is connected to said motor, said lower and upper housings being rotatable relative to one another from a first to a second angular position; rotationally indexing said upper and lower housings relative to one another so that said lower housing rotates to said second angular position; and using the torque that is applied to said orientation sub as said bit is rotated on bottom by said motor to ensure complete rotation of said upper housing to said second position.*

*43. The method of claim 42 including repeating said indexing and using steps to cause said upper housing to rotate relative to said lower housing to other relative angular positions.*

*44. The method of claim 42 wherein each of said indexing steps is carried out in response to changing the flow rate of fluids being pumped through said motor via said coiled tubing.*

*45. A method of drilling a directional borehole using a downhole motor that drives a drill bit, said motor having a bent housing and being suspended in said borehole on a string of coiled tubing, said bent housing providing a bend angle which defines a bend point and which causes the bit to drill along a curved trajectory, comprising the steps of: providing an orienting sub above said motor having relatively rotatable housing members, one of said housing members being connected to the lower end of said coiled tubing and the other of said housing members being connected to the upper end of said motor, indexing said orienting sub to provide a selected angular orientation of said one housing member relative to said other housing member and a corresponding orientation of said bend point about the center of the borehole; and operating said motor while applying an amount of the weight of said coiled tubing to said bit which produces a reactive torque on said bent housing and a lateral force on said bit.*

*46. The method of claim 45 including the further step of varying the amount of said weight on said bit in a manner that produces a change in the magnitude of said reactive torque.*

*47. The method of claim 45 including the further step of performing additional indexing of said orienting sub to obtain other selected angular orientations of said bend point about said center of said borehole to achieve different headings of said bit.*

*48. The method of claim 45 wherein said indexing step is carried out by temporarily reducing and then increasing the flow rate of drilling fluids being pumper down said coiled tubing and through said motor.*

* * * * *